Oct. 2, 1962 M. L. KLEIN ET AL 3,056,949

PULSE TRANSMISSION SYSTEM

Filed July 22, 1958

INVENTORS.
MARTIN L. KLEIN
JOHN S. SUTTON

BY John A. Duffy

AGENT

United States Patent Office 3,056,949

Patented Oct. 2, 1962

3,056,949

PULSE TRANSMISSION SYSTEM

Martin L. Klein, Woodland Hills, and John S. Sutton, San Jose, Calif., assignors to North American Aviation, Inc.

Filed July 22, 1958, Ser. No. 750,201
3 Claims. (Cl. 340—174.1)

This invention relates to pulse transmission circuits and more particularly to a circuit for recovering digital information stored on a magnetic tape.

Electronic data handling systems associated with digital computers commonly utilize magnetic mediums such as tape to record digital information. The information which is supplied in various channels in the handling and recording mechanization of the system must be accurately and automatically identified. Accordingly, the information must be recorded in a way which will permit playback in a manner compatible with the computer in order that the computer results may be obtained within a reasonable and practical length of time.

Practical and reliable means for identifying information supplied in different channels of the handling and recording mechanism of digital processing systems are not provided in present-day computer systems. Present data handling systems and computers are limited in speed and accuracy because of the lack of a practical playback system.

The device of this invention provides a simple and highly accurate playback system for identifying digital pulse information stored on magnetic tape. A high degree of accuracy and reliability in the handling, recording and supplying of digital data to a digital processing system is accomplished by the use of the device of this invention. Speed and accuracy disadvantages and limitations of prior systems are overcome allowing more versatility and application for digital data systems.

It is therefore an object of this invention to provide an improved pulse transmission system.

It is another object of this invention to provide means for identifying information stored on magnetic tape.

It is still another object of this invention to provide a circuit for recovering digital information stored on a magnetic tape.

It is a further object of this invention to provide an improved means for transmitting information stored on a magnetic tape.

It is a still further object of this invention to provide a means for synchronizing pulse information stored on a magnetic tape.

It is another object of this invention to provide for a digital data recovering system.

It is still another object of this invention to provide a system responsive to timing signals on a magnetic tape for synchronizing the output of digital pulse signals stored on the magnetic tape.

Figure 1:
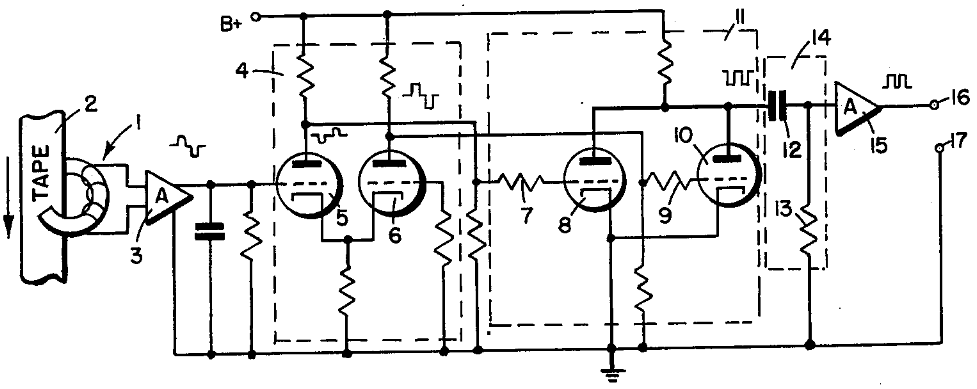
Figure 2:
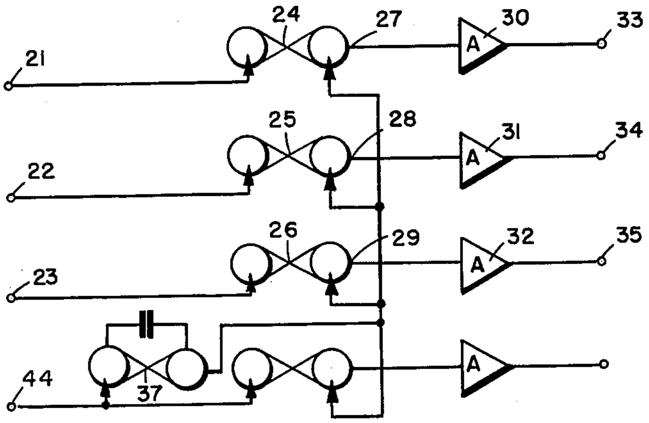
Figure 3:
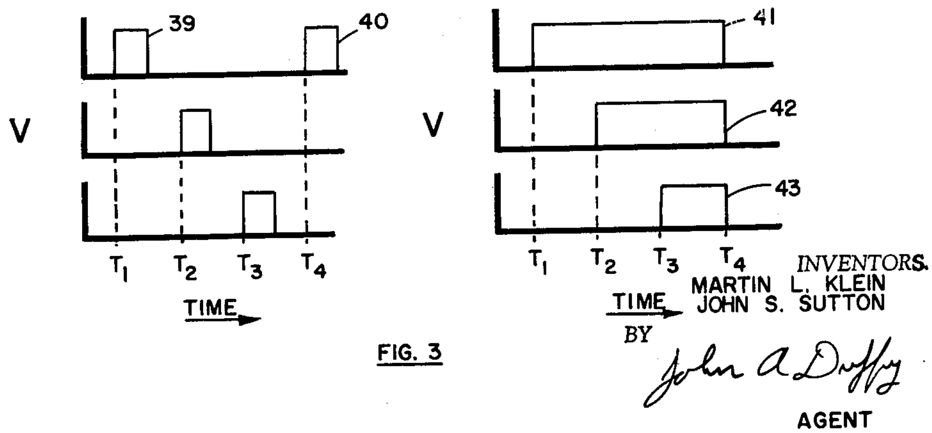

Other objects of this invention will become apparent from the following description taken in connection with the accompanying drawings, in which FIG. 1 is a schematic diagram of the preferred channel pulse amplifier of the invention;

FIG. 2 is a schematic diagram illustrating the means for synchronizing the pulses stored on the magnetic tape; and FIG. 3 is a diagram in graph form showing the output pulses received from the device of this invention.

In carrying out the invention in accordance with the preferred form thereof, apparatus is provided for reading the information stored on a magnetic tape and converting this information to usable pulse signal form. In FIG. 1 there is shown a typical playback channel represented, for example, by play-back head coil 1 located to read information stored on magnetic tape 2. The output of coil 1 is connected to be amplified by amplifier 3 which presents the amplified output to inverter 4 which comprises a pair of triodes 5 and 6. Triode 5 is connected to receive the output signal of amplifier 3 at its grid and present an inverted output thereof at its plate. Triode 6 is connected to follow the signal provided by triode 5 providing at its plate a signal in phase with the signal received from amplifier 3. Thus, the output of inverter 4 taken from the plates from triodes 5 and 6 is a pair of signals of opposite polarities whenever a magnetized portion of tape 2 travels under playback coil 1. The plate output of triode 5 is connected through resistor 7 to the grid of triode 8 and the plate output of triode 6 is connected to resistor 9 to the grid of triode 10. Triodes 8 and 10 comprise clipper adder 11. Resistors 7 and 9 act as grid limiting resistors connected to bias triodes 8 and 10 to positive cutoff. Consequently, clipper adder 11 will transmit strong negative pulses received at the inputs of triodes 8 and 10 but only very weak positive input pulses received there. The output of clipper adder 11 is fed to capacitor 12 and resistor 13 comprising differentiator 14 which differentiates the output of clipper adder 11 and presents a sharp pulse of predetermined amplitude and width to pulse amplifier 15. The output of pulse amplifier 15 is connected to present output pulses at output terminals 16 and 17.

In operation of the circuit of FIG. 1, playback coil 1 receives magnetization signals from tape 2 as the tape moves across coil 1 in the direction shown. Amplifier 3 raises the signal amplitude to a desirable level. The signals from amplifier 3 are then passed through inverter 4 which presents a pair of outputs at the plates of triodes 5 and 6, one output retaining the original input signal and the other output presenting an inverted signal. Clipper adder 11 responds only to negative polarity signals from inverter 4 and adds these responses to provide a single polarity output which is of high amplitude and limited by a predetermined amount. The output of clipper adder 11, which is substantially a square wave pulse, is applied to differentiator 14 which effectively differentiates the leading edge of the square wave pulse and applies a pulse to amplifier 15 which is of predetermined length and amplitude. Output terminals 16 and 17 receive a pulse of predetermined limiting width and amplitude. By differentiating the leading edge of the square wave pulse received from clipper adder 11, an output pulse is obtained whose amplitude and width are proportional to the time of the corresponding pulse information stored on tape 2.

In the circuit of FIG. 1, a device is shown which receives pulse information for one channel and converts this information to an information pulse whose leading edge has been differentiated to provide a pulse of specified width. By differentiating this pulse the timing variations between the reading of the information stored on tape 2 and the presenting of a corresponding pulse to output terminals 16 and 17 have been reduced to a minimum. The timing variations are now due entirely to the function of the rise time and amplitude of the leading edge only of the recovered pulse presented to terminals 16 and 17.

The device of FIG. 1 shows a circuit for one playback channel only. For multiple channel recording where it is desired to provide pulses from a series of channels whose timing variations are minimum and predictable and where it is also desired to refer all the channels to a reference timing channel located on the tape, the circuit of FIG. 2 is provided. In FIG. 2, a plurality of channels, for example, 3, receive input pulses at terminals 21, 22, and 23. Terminals 21, 22, and 23 may correspond to output terminals such as 16 and 17. It is assumed that the input to terminals 21, 22, and 23 are pulse signals which have been operated on by the circuit of FIG. 1. Thus in FIG. 2, terminals 21, 22, and 23 present 3 pulses of predetermined amplitude and width each received under approximately the same time from the magnetic tape 2 of FIG. 1.

Each of terminals 21, 22, and 23 is connected to present pulse signals to flip flops 24, 25, and 26 respectively. Flip flops 24–26 are of the bistable type having two output conditions. Each of the flip flops 24, 25, and 26 is connected to terminals 21, 22, and 23 so that upon receipt of a pulse signal the flip flops will change conditions thereby emitting output pulses at points 27, 28, and 29 respectively. Points 27, 28, and 29 are connected through suitable amplifiers 30, 31, and 32 to present output signals at terminals 33, 34, and 35. Flip flops 24, 25, and 26 are connected to be set, i.e., provide readable output signals at points 27, 28, and 29 by input pulse signals from terminals 21–23. When no pulse signal is transmitted by any of the input terminals 21, 22, and 23, flip flops 24–26 are unaffected. In order to reset flip flops 24–26 after any given receipt of pulses from terminals 21–23, input terminal 44 is provided which is responsive to a timing reference signal stored on tape 2 and operated on by a circuit such as FIG. 1 to provide an output pulse to terminal 44. Connected to receive the output pulse 44 is monostable multivibrator 37 which generates a time-delayed driving signal which is connected to the inputs of flip flops 24, 25, and 26 to reset any of the flip flops which may have been set by a pulse at their associated input terminals from terminals 21–23. The exact timing of the driving signal pulse produced by multivibrator 37 is determined by the reference signal stored on magnetic tape 2 plus a predetermined amount of time delay in multivibrator 37. Thus it is readily seen that the driving signal of the multivibrator 37 operates to reset flip flops 24–26 at the same time. Since flip flops 24–26 are set to provide an output pulse at points 27, 28, and 29 only upon receipt of an input pulse from terminals 21–23, the output pulse presented by terminals 27–29 has a lagging edge or ending time synchronized by the timing reference signal received by input terminal 44. Thus, output pulses are presented at terminals 33, 34, and 35 which have been synchronized in time to the reference timing signal stored on magnetic tape 2.

In FIGS. 3(*a*) and 3(*b*) there is shown a graph illustrating the timing variations of the input pulses at terminals 21, 22, and 23 and the synchronized output pulses at terminals 33, 34, and 35. In FIG. 3(*a*) the pulses corresponding to times $T_1$, $T_2$, and $T_3$ represent the pulses received at terminals 21, 22, and 23. The timing variation of the three pulses may be due to mechanical and/or electrical errors inherent in reading head coil mechanisms. In order to synchronize these pulses, a timing pulse 39, corresponding to the reference pulse provided by terminal 44 is received at time $T_1$, for example, and time-delayed by a predetermined amount, for example, to time $T_4$ which produces a pulse 40 corresponding to the output of multivibrator 37. Thus at time $T_4$ a driving pulse signal resets flip flops 24, 25, and 26 of FIG. 2.

FIG. 3(*b*) shows the output pulses at points 27, 28, and 29 of the flip flops of FIG. 2. Output pulse 41, corresponding to the channel receiving a signal at terminal 21, has a leading edge beginning at time $T_1$ corresponding to the leading edge of the input pulse at terminal 21 and a lagging or finishing edge at time $T_4$ corresponding to the time flip flop 24 receives the driving reset pulse 40 from multivibrator 37. Pulse 42 corresponding to the output pulse received at point 28 commences at time $T_2$ corresponding to the leading edge of the pulse at terminal 22 and terminates at time $T_4$. Similarly, pulse 43 commences at time $T_3$ corresponding to the pulse at terminal 23 and terminates at time $T_4$. Thus it can be seen that pulses 41, 42, and 43 all terminate at exactly the same time. These pulses may then be operated on by circuitry well-known in the art and not a part of this invention to provide pulses which are synchronized at time $T_4$ in accordance with the reference timing pulse stored on tape 2.

The channel pulse amplifier of FIG. 1 and the synchronizing system have particular application in data handling systems where numerous information channels are operated simultaneously, i.e., in parallel, from one tape. In such a device utilizing the system of this invention timing variations of pulses are reduced to a negligible and inconsequential time. Thus, simple and accurate timing control is realized from simple circuitry.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A channel pulse amplifier system comprising a magnetic recording signal pickup means for reading two-polarity pulse information from a magnetized medium, a phase inverter connected to be responsive to said tape signal pickup for producing signals of opposite polarities from each of the said two polarities, a clipper adder providing square wave output signals, said clipper adder connected to receive signals from said inverter, said inverter comprising means for producing substantially square wave output signals of a single polarity in response to each of said signals of opposite polarity received by said magnetic recording signal pickup means, means for differentiating the square wave signals produced by said clipper adder, and amplifier means responsive to the output of said differentiator means for producing pulses of predetermined width, means connected to be set by another signal, said latter means connected to be reset in accordance with said pulses of predetermined width whereby the termination of the output of said latter means is precisely controlled.

2. Means for transmitting information stored on a magnetic tape comprising a plurality of reading coils responsive to said magnetic tape for providing electrical signals according to said information, a plurality of channel amplifier means responsive to said reading coils for providing pulses of predetermined width and amplitude, a plurality of flip flops, each said flip flop having two alternative output conditions, each said flip flop responsive to a corresponding tape signal to be set to one of said conditions in accordance with the information stored on said magnetic tape, timing channel amplifier means responsive to a timing signal stored on said tape for providing timing pulses, a monostable multivibrator responsive to said timing pulses for producing synchronizing pulses, said timing pulses connected to reset each set flip flop to said other condition whereby each said multivibrator provides a pulse having a trailing edge corresponding to said timing signal, and means for amplifying said pulses.

3. In a recorded information playback system having a magnetic medium upon which information is stored and having a plurality of signal channels, at least one said channel comprising a timing channel, pulse transmission circuit means for each said channel responsive to pulse information stored on said magnetic medium for providing pulses of predetermined amplitude and minimum width, each said circuit means including a tape signal pickup for reading pulse information stored on said magnetic medium, a phase inversion circuit responsive to said signal pickup for producing a pair of signals of opposite phase, said phase inversion circuit comprising a first triode connected to receive the output of said signal pickup at its grid for presenting an inverted output thereof at its plate, a second triode responsively connected to follow the signal provided by said first triode for providing at its plate a signal in phase with the signal for said signal pickup, a clipper adder circuit responsive to the outputs of said phase inversion circuit for producing substantially square wave signals of a positive polarity, said clipper adder comprising a third triode responsive to the output of said first triode for providing at its plate square wave signals of positive polarity, and means for differentiating the leading edges of said square wave signals to produce signals of minimum width; a bistable multivibrator connected to receive pulses from each said amplifier to be set to one state, an amplifier responsive to reference timing pulses information on said timing channel for producing timing pulses, delay means responsive to said timing amplifier for producing delayed reset pulses, each said bistable multivibrator being responsive to said reset pulses to be reset at the same time, and amplifier means responsive to each said multivibrator for amplifying the pulse formed between the time each multivibrator is set and reset.

References Cited in the file of this patent

UNITED STATES PATENTS

| | | |
|---|---|---|
| 2,695,992 | Winger et al. | Nov. 30, 1954 |
| 2,793,344 | Reynolds | May 21, 1957 |
| 2,804,605 | De Turk | Aug. 27, 1957 |
| 2,817,829 | Lubkin | Dec. 24, 1957 |
| 3,007,145 | Murphy | Oct. 31, 1961 |